US009520960B2

(12) United States Patent
Bianchi (10) Patent No.: US 9,520,960 B2
(45) Date of Patent: Dec. 13, 2016

(54) OPTICAL MULTIPLEX LEVEL AND OPTICAL CHANNEL LAYER SERVER TRAILS IN WAVELENGTH SWITCHED OPTICAL NETWORKS

(71) Applicant: Cisco Technology, Inc., San Jose, CA (US)

(72) Inventor: David Bianchi, Cambiago (IT)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 14/164,435

(22) Filed: Jan. 27, 2014

(65) Prior Publication Data

US 2015/0215686 A1     Jul. 30, 2015

(51) Int. Cl.
*H04B 10/00*     (2013.01)
*H04J 14/02*     (2006.01)
*H04J 14/00*     (2006.01)

(52) U.S. Cl.
CPC ........ *H04J 14/0212* (2013.01); *H04J 14/0256* (2013.01); *H04J 14/0261* (2013.01); *H04J 14/0279* (2013.01)

(58) Field of Classification Search
CPC H04J 14/0227; H04J 14/0267; H04J 14/0272; H04J 14/0275; H04J 14/0273; H04J 14/0261

See application file for complete search history.

(56) References Cited

U.S. PATENT DOCUMENTS

| 8,467,382 | B1* | 6/2013 | Doverspike | ............ H04B 10/03 370/355 |
|---|---|---|---|---|
| 2011/0274427 | A1 | 11/2011 | Madrahalli et al. | |
| 2012/0183294 | A1* | 7/2012 | Boertjes | .............. H04J 14/0204 398/49 |
| 2013/0051788 | A1 | 2/2013 | Marcenaro et al. | |

OTHER PUBLICATIONS

ITU, "Optical Transport Network (OTN) Tutorial", http://www.itu.int/ITU-T/studygroups/com15/otn/OTNtutorial.pdf, retrieved Dec. 9, 2013, 62 Pages.

\* cited by examiner

*Primary Examiner* — Daniel Dobson
(74) *Attorney, Agent, or Firm* — Edell, Shapiro & Finnan, LLC (57) ABSTRACT

An optical network packet configured to transmit over an optical communication link from a first optical network having a first control plane to a second optical network having a second control plane is generated. Generating the optical network packet comprises generating the packet configured to be transmitted from the first optical network to the second optical network in the optical domain.

21 Claims, 6 Drawing Sheets

OPTICAL MULTIPLEX LEVEL AND OPTICAL CHANNEL LAYER SERVER TRAILS IN WAVELENGTH SWITCHED OPTICAL NETWORKS

TECHNICAL FIELD

The present disclosure relates to wavelength switched optical networks, and in particular, server trails between wavelength switched optical network islands.

BACKGROUND

A wavelength-switched optical network ("WSON") consists of two planes: a data plane and a control plane. The data plane comprises wavelength division multiplexing (WDM) fiber links connecting optical cross-connect ("OXCs") through a combination of several tens of wavelength channels. Optical end-to-end connections (i.e., lightpaths) are established in the optical domain and switched by OXCs with wavelength granularity. In WSONs the optical signal is switched with wavelength granularity, and therefore, the wavelength assignment process (selecting the carrier of each established lightpath) plays a crucial role in dynamic network operation. The dynamic provisioning and maintenance of lightpaths is managed by the control plane. The control plane is implemented on a separate network and typically employs one network controller for each node in the data plane. In this context, an optical network packet may include a generic frame of information transmitted over an optical network without reference to packet switching technology.

A server trail is a non-data communication channel link across a third-party network that connects two network domains. Specifically, a server trail provides a connection between optical networking system nodes through a third-party network.

DESCRIPTION OF EXAMPLE EMBODIMENTS

Overview

An optical network packet is generated which is configured to transmit over an optical communication link from a first optical network having a first control plane to a second optical network having a second control plane. The optical network packet so generated is configured to be transmitted from the first optical network to the second optical network in the optical domain.

Example Embodiments

Figure 1:
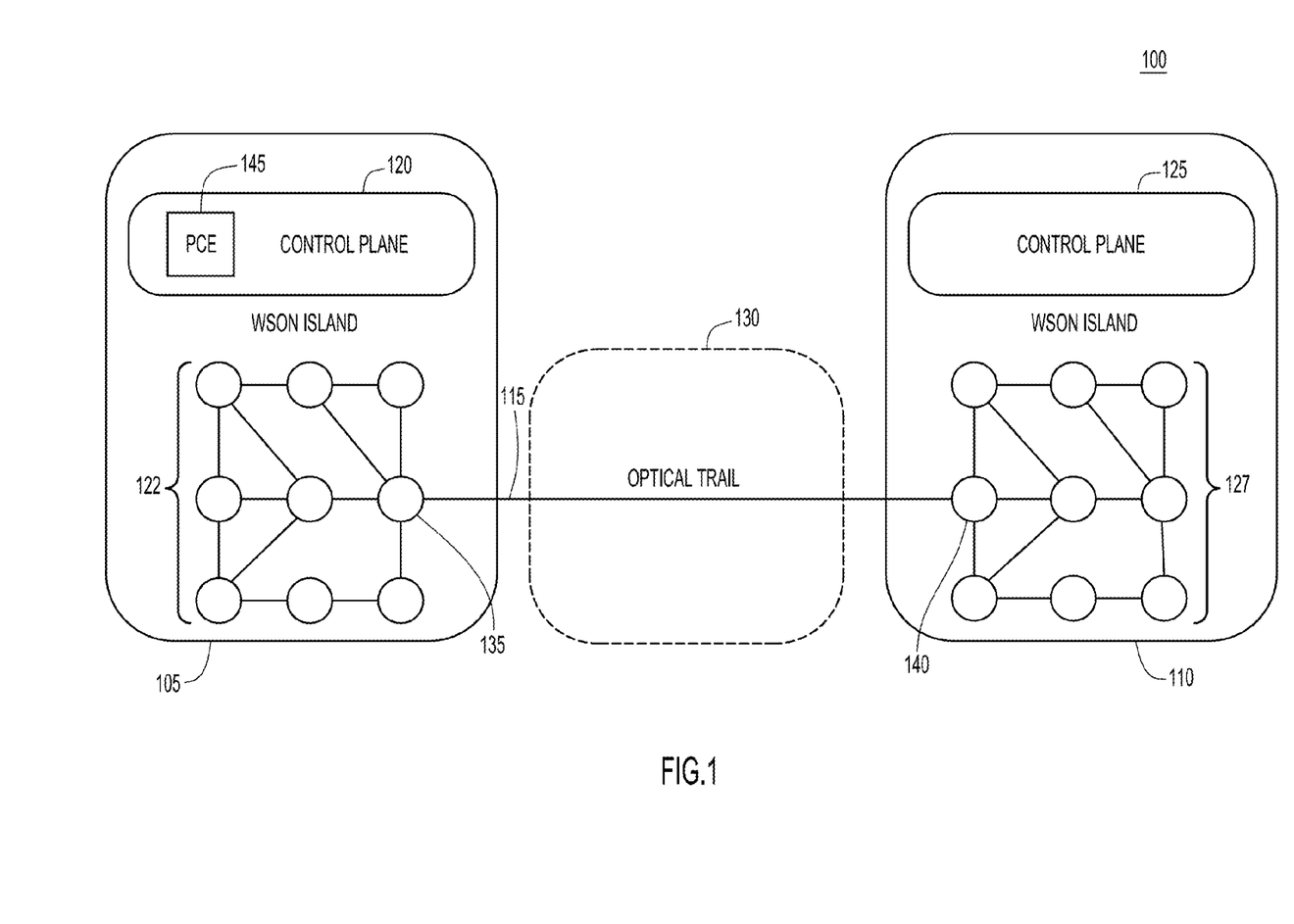
FIG. 1 illustrates an example of a system of wavelength switched optical networks configured to transmit traffic over optical multiplex level and/or optical channel layer server trails.

Depicted in FIG. 1 is a system of optical networks 100 configured to provide Optical Multiplex Section ("OMS") or Optical Channel ("OCH") network connection server trails. Specifically, a first wavelength-switched optical network ("WSON") island 105 is connected to a second WSON island 110 through a third party server trail 115. A single organization (e.g., a service provider entity) may utilized multiple WSON islands, such as first WSON island 105 and second WSON island 110, when a customer has two or more deep wave division multiplexing vendors, when a single customer has multiple geographical administrations, or when one service provider is handing over service to another service provider.

First WSON island 105 is controlled by first control plane 120, and transmits network traffic through first data plane 122. Similarly, second WSON island is controlled by second control plain 125, and transmits data through second data plane 127. According to some examples, first control plain 120 is independent from second control plane 125. It also may be the case that first control plane 120 and second control plane 125 are interconnected. Optical server trail 115 passes through third party network 130, which is not under the control of either first control plane 120 or second control plane 125.

First trail termination unit ("TTU") 135 is configured to send data over server trail 115 without ever leaving the optical domain of first WSON 105. For example, first TTU 135 may transmit network traffic over server trial 135 without having to demultiplex a deep wave division multiplex ("DWDM") signal transmitted through first data plane 122. Accordingly, the traffic may be sent over server trail 115 without ever leaving the Optical Multiplex Section ("OMS") of the Optical Transport Network ("OTN") domain. Accordingly, when received at second TTU 140, the OMS traffic may be further transported over second data plane 127 without leaving the OMS layer of the OTN domain.

According to another example, first TTU 135 may demultiplex the DWDM signal in order to separate one or more of the DWDM channels. One or more of the demultiplexed channels may then be sent over server trail 115 to second TTU 140. In other words, the signal is sent from first WSON island 105 to second WSON island 110 without ever leaving the optical channel ("OCH") layer of the OTN domain. Once received at second TTU 140, the signal may be multiplexed with additional channels, and transported over second data plane 127.

Also illustrated in FIG. 1 is path computation element ("PCE") 145. PCE 145 is a network element that resides in the first control plane 120, and determines the path for traffic through first data plane 122. Because traffic will be sent across optical trail 115 without demultiplexing and/or optical-to-electrical conversion, PCE 145 may identify optical trail 115 in the same way it would identify any of the other optical links in first data plane 122. For example, if PCE 145 calculates paths according to the generalized multi-protocol label switching ("GMPLS") protocol, server trail 115 may be referenced in the GMPLS label in the same manner as any other optical link in first data plane 122. Accordingly, first TTU 135 may be treated as a label switch router instead of a label edge router. Accordingly, TTU 135 will not need to remove the GMPLS label before forwarding the packet over server trail 115. Similarly, PCE 145, if it is aware of second WSON island 110, may be configured to generate a single GMPLS label for the entire path of the packet through first data plane 122, over server trail 115, and through second data plane 127.

In other words, PCE 145 undertakes a process in which PCE 145 generates, or causes one or more network enabled devices, to generate an optical network packet that is configured to transmit over an optical communication link from a first optical network to a second optical network, such as first and second WSON islands 105 and 110. The first optical network and the second optical network may be configured with separate control planes, just as first WSON island 105 is configured with first control plane 120 and second WSON island 110 is configured with second control plane 125. The packet generated, or caused to be generated, by PCE 145 is configured to be transmitted from the first optical network to the second optical network in the optical domain. For example, PCE 145 may cause the optical packet to be generated as a GMPLS packet in which the optical transmission link, server trail 115 for example, is treated as any other optical link in first data plane 122. Accordingly, PCE 145 can cause a packet to be sent from first WSON island 105 to second WSON island without ever leaving the OCH layer of the OTN domain or the OMS layer of the OTN domain.

By transmitting signals over server trail 115 while remaining in the optical domain (e.g., without performing optical-electrical conversion on the signal and/or without demultiplexing the signal), first WSON island 105 and second WSON island 110 can receive efficiency and performance gains over other types of server trails. For example, a customer that has two or more deep wave division multiplexing vendors may require that the same wavelength be used for the same channel in both islands (i.e., "lambda end-to-end"). By transmitting the traffic without leaving the optical domain (e.g., without performing optical-to-electrical conversion of the signal at a TTU), re-amplification, reshaping and retiming ("3R") regeneration costs may be avoided. Similarly, when one customer administers its networks from geographically diverse locations, the customer may avoid unnecessary 3R regeneration costs.

Furthermore, when the administrators of first WSON island 105 and second WSON island 110 lacks control over third party network 130, it is still possible to transmit over server trail 115. Specifically, if the traffic being transmitted over server trail 115 remains in the optical domain, there are no interactions that must take place between a WSON island and the provider of the server trail. Instead, for an OMS server trail all that is needed on the first WSON island side is for TTU 135 to be provisioned with the required power per channel, the total power, and the optical signal-to-noise ratio per channel. For an OCH network connection server trail all that is needed on the first WSON island side is for TTU 135 to be provisioned with the necessary optical characteristics, such as an alien wavelength definition. According to other examples, OMS server trails and OCH network connection server trails may also be dynamically provisioned if communication with third party network 130 is available and/or permissible.

Figure 2:
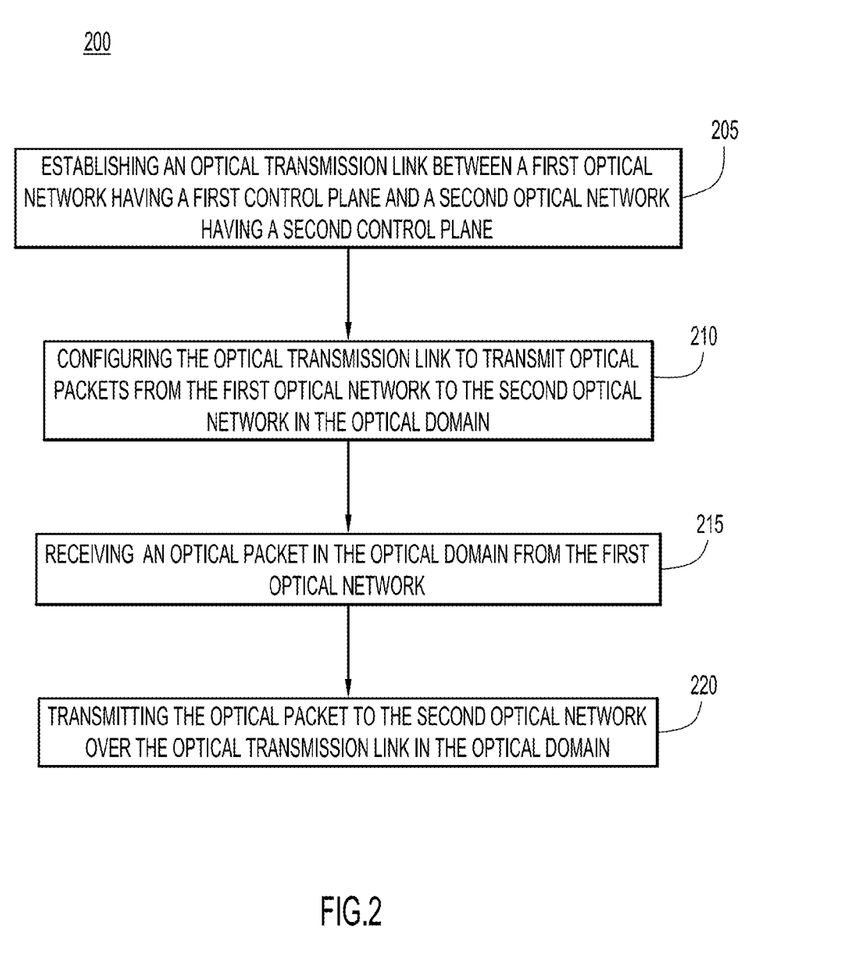
FIG. 2 is a flowchart illustrating a process for transmitting optical network traffic over optical multiplex level and/or optical channel layer server trails.

With reference now made to FIG. 2, depicted therein is flowchart 200 illustrating a process for providing OMS server trails or OCH network connection server tails between two WSON islands from the perspective of a sending device at the edge of one of the two WSON islands. The process begins in 205 where an optical transmission link is established between a first optical network having a first control plane and a second optical network having a second control plane. For example, the first and second optical networks may comprise WSON islands and the optical transmission link may comprise an optical server trail, as described above with reference to FIG. 1.

In 210 the optical transmission link is configured to transmit optical packets from the first optical network to the second optical network in the optical domain. For example, a TTU of the first optical network may be configured with a reconfigurable optical add-drop multiplexer ("ROADM"). A ROADM is a form of optical add-drop multiplexer that has the ability to remotely switch traffic from a wavelength division multiplexing ("WDM") or DWDM system at the wavelength layer. The switching at the wavelength layer is achieved through the use of a wavelength selective switching module, which allows for individual or multiple wavelength carrying data channels to be added and/or dropped from a transport fiber without needing to convert the signals on all of the channels to electronic signals and back again to optical signals. Accordingly, individual channels may be transmitted over the OCH layer without ever leaving the optical domain. Similarly, the entire multiplexed signal may also be transmitted over the transmission link without ever leaving the optical domain.

In 215, an optical packet is received in the optical domain from the first optical network, while in 220, the optical packet is transmitted to the second optical network over the optical transmission link in the optical domain. According to some examples, such as the example described below with reference to FIG. 3, the optical packet is transmitted over the transmission link without demultiplexing. In other words, the packet is transmitted in the OMS of the OTN domain without ever undergoing demultiplexing and optical-to-electric conversion. According to other examples, such as the example described below with reference to FIG. 4, an optical signal may be demultiplexed so that one or more channels are separated from the multiplexed signals. The demultiplexed channels may then be transmitted over the transmission link the OCH channel of the OTN domain.

Figure 3:
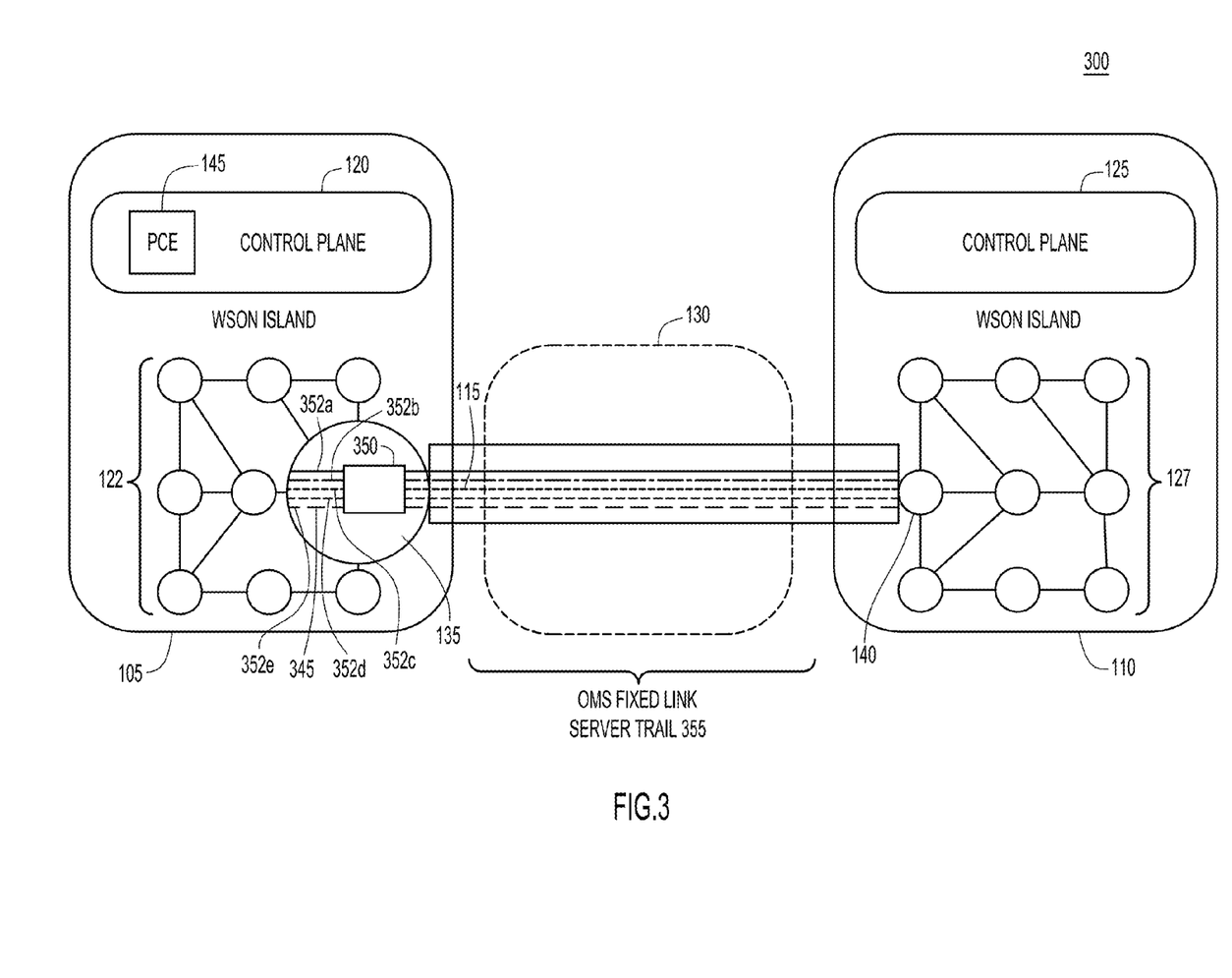
FIG. 3 illustrates an example of a second system of wavelength switched optical networks configured to transmit optical traffic over an optical multiplex level server trail without demultiplexing the optical traffic.

With reference now made to FIG. 3, depicted therein is a system of optical networks 300 configured to provide OMS server trails. System 300 is similar to that of FIG. 1, and therefore like reference numerals have been used to refer to like elements of the figures. Included in FIG. 3 is an expanded view of first TTU 135. TTU 135 receives a multiplexed optical signal 345 at ROADM 350. The multiple channels of optical signal 345 are symbolically illustrated through channels 352*a-e*. The server trail between first WSON island 105 and second WSON island 110 is configured as an OMS fixed link server trail 355. Accordingly, the signal received by ROADM is transmitted over OMS fixed link server trail 355 without undergoing demultiplexing. Accordingly, all or a partial set of channels 352*a-e* are transmitted over OMS fixed link server trail 355.

Figure 4:
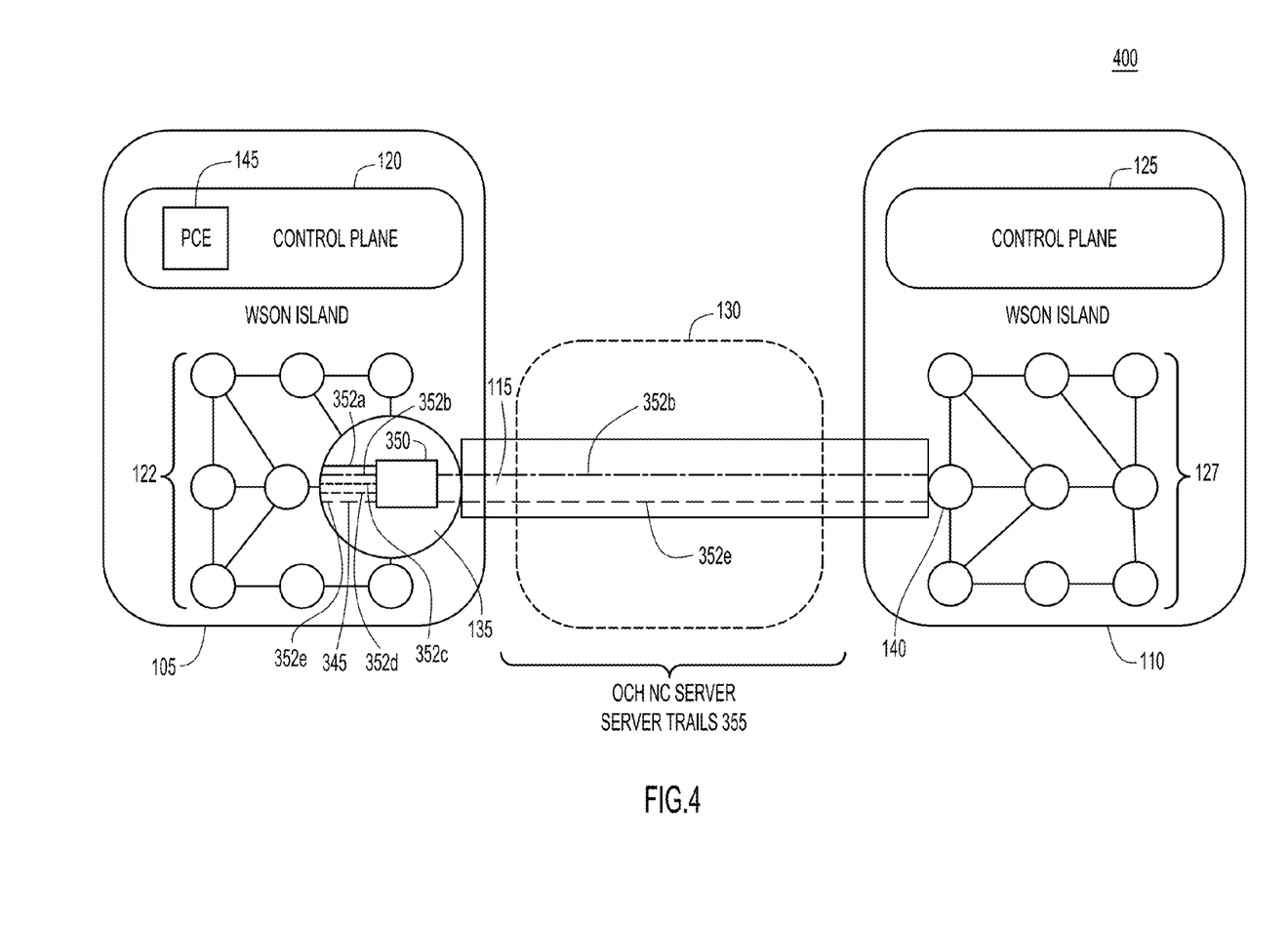
FIG. 4 illustrates an example of a third system of wavelength switched optical networks configured to transmit optical traffic over an optical channel layer server trail without converting the optical traffic from the optical domain to the electrical domain.

With reference now made to FIG. 4, depicted therein is a system of optical networks 400 configured to provide OCH network connection server trails. System 400 is similar to that of FIGS. 1 and 3, and therefore like reference numerals have been used to refer to like elements of the figures. As in FIG. 3, TTU 135 receives a multiplexed optical signal 345 at ROADM 350. Unlike FIG. 3, only channels 352*b* and 352*e* are designated in, for example, a GMPLS label for transmission over OCH network connection server trail 455. Accordingly, ROADM 350 demultiplexes optical signal 345, and drops channels 352*a*, 352*c* and 352*d*, and transmits only channels 352*b* and 352*e* over OCH network connection server trail 455. Because 3R regenerations are not performed in order to drop channels 352*a*, 352*c* and 352*d* and transmit channels 352*b* and 352*e*, the costs normally associated with 3R regeneration may be avoided.

Figure 5:
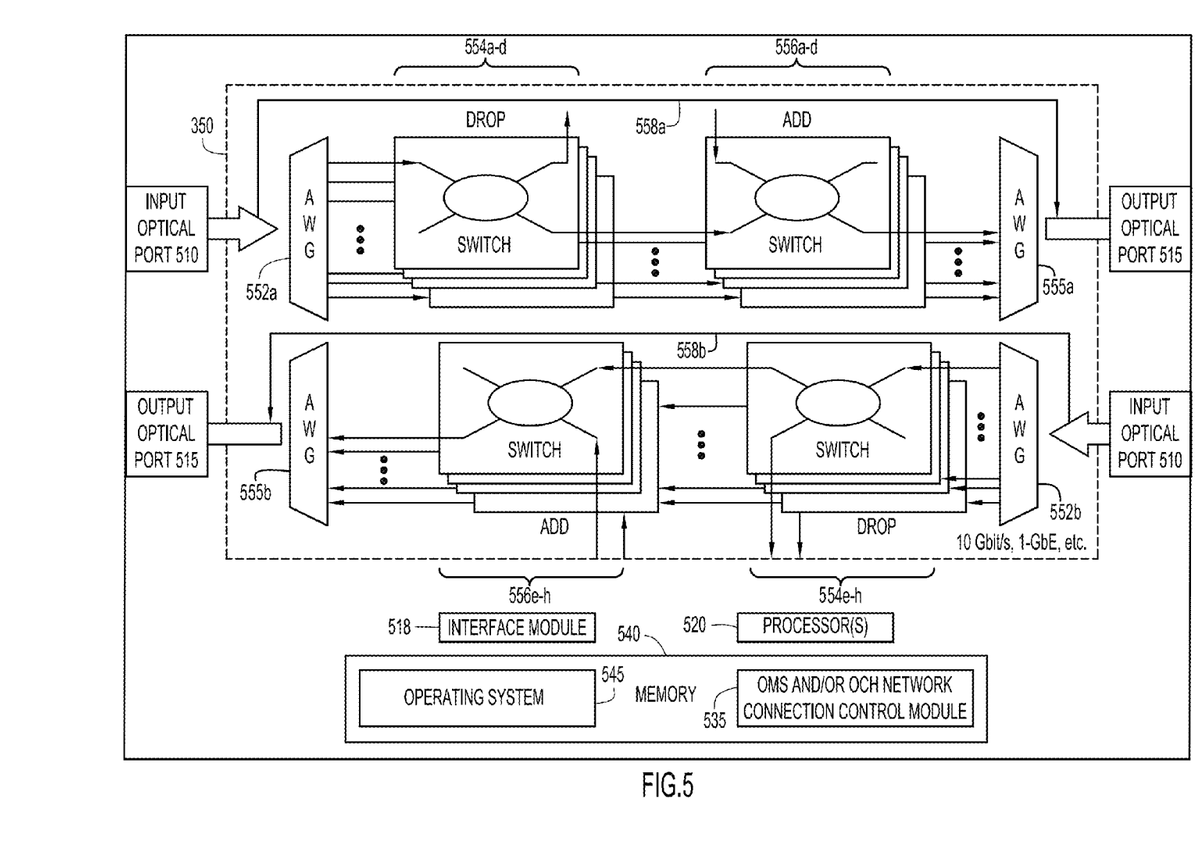
FIG. 5 is a block diagram showing an example of a trail termination unit configured to transmit optical traffic over optical multiplex level and/or optical channel layer server trails.

With reference now made to FIG. 5, depicted therein is an example TTU, such as TTU 135 of FIGS. 1, 3 and 4. TTU 135 comprises input optical ports 510 and output optical ports 515 which serve as the inputs and outputs for ROADM 350. Interface module 518 allows processor(s) 520 to communicate and control ROADM 350 in accordance with instructions contained in memory 540. Memory 540 contains software instructions for operating system 545 and OMS and/or OCH network connection control module 535. For simplicity, the example illustrated in ROADM 350 is a 2-degree ROADM, however the techniques taught herein apply to an undetermined number of degrees.

Memory 540 may comprise read only memory (ROM), random access memory (RAM), magnetic disk storage media devices, optical storage media devices, flash memory devices, electrical, optical, or other physical/tangible (e.g., non-transitory) memory storage devices. The processor 520 is, for example, a microprocessor or microcontroller that executes instructions for TTU 135. Thus, in general, the memory 540 may comprise one or more tangible (non-transitory) computer readable storage media (e.g., a memory device) encoded with software comprising computer executable instructions and when the software is executed (by the processor 520), and in particular the instructions for the OMS and/or OCH network connection control module 535, it is operable to perform the operations described herein in connection with FIGS. 1-4. Specifically, OMS and/or OCH network connection control module 535 includes instructions that allow processor 520 to control ROADM 350 to transmit optical packets over an OMS and/or OCH network connection server trail without conversion out of the optical domain, and/or without the need for 3R regeneration.

For example, processor 520 sends instructions to ROADM 350 to pass-through, add and/or drop optical channels from optical signals received through one or more of input optical ports 510. When an optical signal is input through input optical ports 510, the optical signal may be demultiplexed through one of arrayed waveguide gratings 552*a* or 552*b*. Each individual channel traverses one of drop switches 554*a-h* which, in response to instructions sent from processor 520 through interface module 518, may cause ROADM 350 to drop one or more of the received channels. Similarly, instructions sent from processor 520 through interface module 518, may cause ROADM 350 to add one or more channels through add switches 556*a-h*. Finally, the remaining channels may be remultiplexed through one of arrayed waveguide gratings 555*a* or 555*b* and transmitted over an OMS and/or OCH network connection server trail. The received optical signal may also simply pass through ROADM 350 as illustrated through pass-throughs 558*a* and 558*b*.

Figure 6:
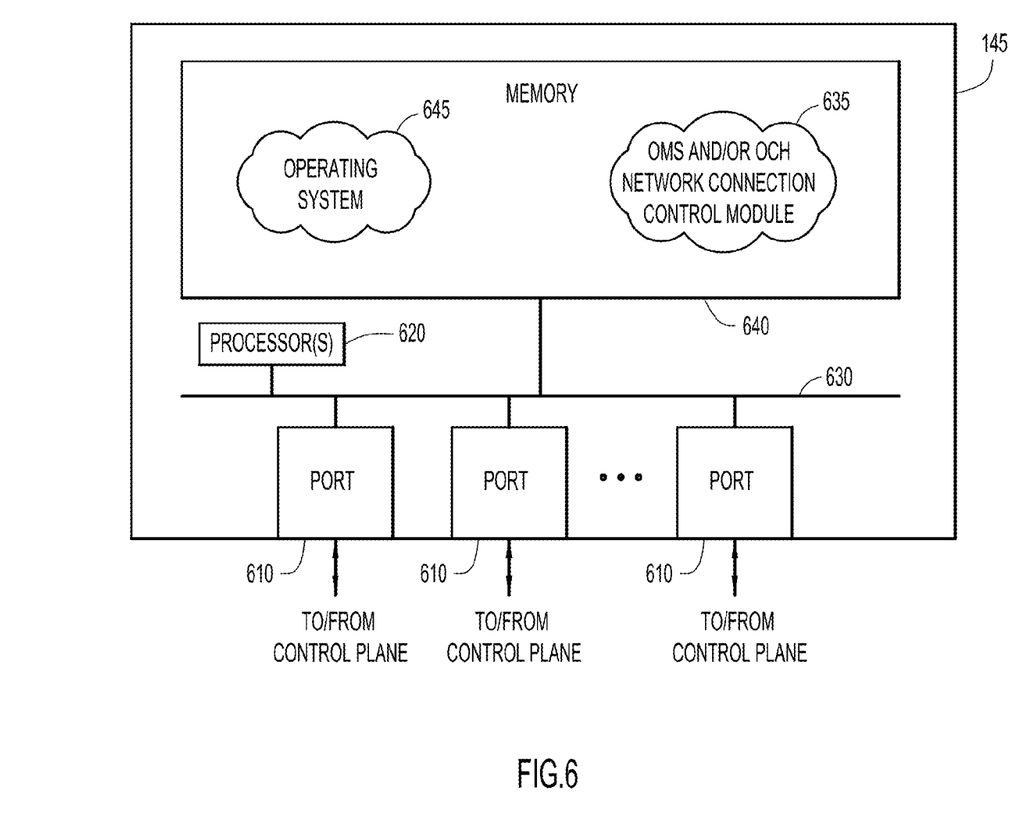
FIG. 6 is a block diagram showing an example of a path computation element configured to determine paths through a system of wavelength switched optical networks which include optical multiplex level and/or optical channel layer server trails.

Turning now to FIG. 6, depicted therein is an example block diagram of a network device, e.g., PCE 145, configured to perform the techniques described herein in connection with FIGS. 1-4. PCE 145 comprises one or more ports 610 to enable communication over a control plane, processor(s) 620, bus 630, and memory 640. The memory 640 contains software instructions for operating system 645 and OMS and/or OCH network connection control module 635.

Memory 640 may comprise read only memory (ROM), random access memory (RAM), magnetic disk storage media devices, optical storage media devices, flash memory devices, electrical, optical, or other physical/tangible (e.g., non-transitory) memory storage devices. The processor 620 is, for example, a microprocessor or microcontroller that executes instructions for PCE 145. Thus, in general, the memory 640 may comprise one or more tangible (non-transitory) computer readable storage media (e.g., a memory device) encoded with software comprising computer executable instructions and when the software is executed (by the processor 620), and in particular the instructions for the OMS and/or OCH network connection control module 635, it is operable to perform the operations described herein in connection with FIGS. 1-4. Specifically, OMS and/or OCH network connection control module 635 includes instructions that allow processor 620 generate, or cause one or more network enabled devices, to generate an optical network packet that is configured to transmit over an optical communication link from a first optical network to a second optical network without conversion out of the optical domain, and/or without the need for 3R regeneration. The functionality provided by PCE 145 may reside in all or a partial set of the optical devices present in the control plane of an optical network.

Again, the techniques presented herein involve a GMPLS/WSON configured to use "pre-provided" OMS links or OCH network connections used as trails, as part of end-to-end wavelength connections. This allows for a dynamic WSON working in a brown field environment where administrative separation makes inconvenient the extension of GMPLS to the whole network.

In summary, according to one aspect, a method is provided comprising generating an optical network packet configured to transmit over an optical communication link from a first optical network having a first control plane to a second optical network having a second control plane. The generating of the network packet further comprises generating the packet configured to be transmitted from the first optical network to the second optical network in the optical domain.

In accordance with another aspect, a method is provided comprising establishing an optical transmission link between a first optical network having a first control plane and a second optical network having a second control plane; configuring the optical transmission link to transmit optical packets from the first optical network to the second optical network in an optical domain; receiving an optical network packet in the optical domain from the first optical network; and transmitting the optical network packet to the second optical network in the optical domain.

In accordance with still a further aspect, an apparatus is provided comprising: at least one input optical port; at least one output optical port; and a processor. The processor is configured to: establish an optical transmission link between a first optical network having a first control plane and a second optical network having a second control plane; configure the optical transmission link to transmit optical packets from the first optical network to the second optical network in an optical domain; cause an optical network packet in the optical domain to be received from the first optical network through the at least one input optical port; and cause the optical network packet to be transmitted to the second optical network in the optical domain through the output optical port.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
generating an optical network packet configured to transmit over an optical communication link from a first optical network having a first control plane to a second optical network having a second control plane;
wherein generating the network packet further comprises generating the packet configured to be transmitted from the first optical network to the second optical network in an optical multiplex section of an optical transport network domain without undergoing demultiplexing at an edge of the first optical network.

2. The method of claim 1, wherein generating the optical network packet comprises generating the optical network packet configured to be transmitted over the optical communication link without re-amplification, reshaping or retiming of the optical network packet.

3. The method of claim 2, wherein generating the optical network packet comprises generating the optical network packet configured to be transmitted in an optical channel layer of the optical network domain.

4. The method of claim 2, wherein the optical communication link is an optical channel layer transmission link.

5. The method of claim 1 wherein generating the optical network packet comprises generating the optical network packet to be transmitted over the optical communication link without undergoing optical-to-electrical conversion.

6. The method of claim 1, wherein transmitting the optical network packet comprises transmitting the optical network packet from a trail termination unit.

7. The method of claim 1, wherein the generating the optical network packet comprises generating a packet configured to be transmitted from a first trail termination unit to a second trail termination unit.

8. The method of claim 1, wherein generating the optical network packet comprises generating the optical network packet to be transmitted by a reconfigurable optical add-drop multiplexer.

9. The method of claim 1, wherein generating the optical network packet comprises generating a Generalized Multi-Protocol Label Switching packet.

10. A method comprising:
establishing an optical transmission link between a first optical network having a first control plane and a second optical network having a second control plane;
configuring the optical transmission link to transmit optical packets from the first optical network to the second optical network in an optical multiplex section transmission link of an optical domain;
receiving an optical network packet in the optical domain from the first optical network; and
transmitting the optical network packet to the second optical network in the optical domain without demultiplexing the optical packet.

11. The method of claim 10, wherein:
receiving the optical network packet comprises receiving the optical network packet at a trail termination unit; and
transmitting the optical network packet comprises transmitting the optical network packet from the trail termination unit.

12. The method of claim 10, wherein configuring the optical transmission link comprises configuring the optical transmission link as an optical channel layer transmission link.

13. The method of claim 12, wherein transmitting the optical network packet comprises transmitting the optical network packet without performing optical-to-electrical conversion of the optical network packet.

14. The method of claim 10, wherein transmitting the optical network packet comprises transmitting the optical network packet without re-amplification, reshaping or retiming ("3R Regeneration") of the optical network packet.

15. The method of claim 10, wherein transmitting the optical network packet comprises transmitting optical network packet via a reconfigurable optical add-drop multiplexer.

16. An apparatus comprising:
at least one input optical port;
at least one output optical port; and
a processor, wherein the processor is configured to:
establish an optical transmission link between a first optical network having a first control plane and a second optical network having a second control plane;
configure the optical transmission link to transmit optical packets from the first optical network to the second optical network in an optical multiplex section transmission link of an optical domain;
cause an optical network packet in the optical domain to be received from the first optical network through the at least one input optical port; and
cause the optical network packet to be transmitted to the second optical network in the optical domain through the output optical port without demultiplexing the optical network packet.

17. The apparatus of claim 16, further comprising a reconfigurable optical add-drop multiplexer.

18. The apparatus of claim 16, wherein the processor is further configured to transmit the optical network packet without re-amplificiation, reshaping or retiming ("3R Regeneration") of the optical network packet.

19. The apparatus of claim 16, wherein the processor is further configured to transmit the optical network packet without performing optical-to-electrical conversion of the optical network packet.

20. The apparatus of claim 16, wherein the processor is configured to configure the optical transmission link to transmit optical packets from the first optical network to the second optical network in the optical domain by configuring the optical transmission link as an optical channel layer transmission link.

21. The apparatus of claim 16, wherein the apparatus is a trail termination unit.

* * * * *